US012723459B2

(12) United States Patent
Hsieh

(10) Patent No.: US 12,723,459 B2
(45) Date of Patent: Sep. 1, 2026

(54) OVERHEAD DOOR SYSTEM AND DOOR OPERATOR THEREOF

(71) Applicant: Chung-Hsien Hsieh, New Taipei City (TW)

(72) Inventor: Chung-Hsien Hsieh, New Taipei City (TW)

( * ) Notice: Subject to any disclaimer, the term of this patent is extended or adjusted under 35 U.S.C. 154(b) by 0 days.

(21) Appl. No.: 19/095,826

(22) Filed: Mar. 31, 2025

(65) Prior Publication Data

US 2026/0210169 A1 Jul. 23, 2026

(30) Foreign Application Priority Data

Jan. 22, 2025 (TW) ................................ 114102882

(51) Int. Cl.
*E05F 15/686* (2015.01)

(52) U.S. Cl.
CPC ......... *E05F 15/686* (2015.01); *E05Y 2201/22* (2013.01); *E05Y 2201/654* (2013.01); *E05Y 2201/664* (2013.01); *E05Y 2400/326* (2013.01)

(58) Field of Classification Search
CPC .......... E05F 15/686; E05F 15/41; E05F 15/59
See application file for complete search history.

(56) References Cited

U.S. PATENT DOCUMENTS

| | | | | |
|---|---|---|---|---|
| 1,815,397 A * | 7/1931 | Colman | E05F 15/619 318/266 |
| 5,931,212 A * | 8/1999 | Mullet | E05F 15/668 74/625 |
| 7,061,197 B1 * | 6/2006 | Mullet | E05F 15/668 318/471 |
| 7,161,100 B1 * | 1/2007 | Hsieh | H01H 19/186 200/47 |
| 2008/0197792 A1 * | 8/2008 | Hsieh | E06B 9/82 318/10 |
| 2016/0024835 A1 * | 1/2016 | Hsieh | E05F 3/16 318/364 |
| 2017/0037671 A1 * | 2/2017 | Angiuli | E05D 13/1215 |

FOREIGN PATENT DOCUMENTS

| | | | |
|---|---|---|---|
| CN | 109113558 | A | 1/2019 |
| JP | 2012237135 | A | 12/2012 |
| JP | 2013527348 | A | 6/2013 |
| TW | 1790954 | * | 1/2023 |
| TW | 202338203 | A | 10/2023 |
| TW | 1844335 | * | 6/2024 |

* cited by examiner

*Primary Examiner* — Gregory J Strimbu
(74) *Attorney, Agent, or Firm* — McClure, Qualey & Rodack, LLP

(57) ABSTRACT

An overhead door system includes a door operator, which includes a motor assembly, an actuation assembly, a ratchet retaining device, and a controller. The motor assembly has a rotating shaft operably connected to a shaft rod. The actuation assembly includes a ratchet wheel and a gear train. The gear train is operably connected to the rotating shaft, and the ratchet wheel is operably connected to the gear train. The ratchet wheel correspondingly transmits a torque in response to the motor assembly driving the rotating shaft to rotate. The ratchet retaining device is configured to generate a positioning retention force on the ratchet wheel. The controller is configured to generate a control signal based on a detection signal and an adjustment parameter, to adjust the positioning retention force based on the control signal.

10 Claims, 5 Drawing Sheets

OVERHEAD DOOR SYSTEM AND DOOR OPERATOR THEREOF

CROSS-REFERENCE TO RELATED APPLICATION

This non-provisional application claims priority under 35 U.S.C. § 119(a) to Patent Application No. 114102882 filed in Taiwan, R.O.C. on Jan. 22, 2025, the entire contents of which are hereby incorporated by reference.

BACKGROUND

Technical Field

The present disclosure relates to an overhead door system, and in particular, to an overhead door system with an ascending or descending door panel, and a door operator of the overhead door system.

Related Art

A sectional lifting overhead door mainly ascends or descends under the assistance of a torsion spring, and a lifting force provided by the torsion spring is transmitted via a cable. The cable is wound on drums on both sides of the door. The drums are driven by the torsion spring to wind or unwind the cable, to drive a door panel to ascend or descend. Therefore, the cable is required to maintain an appropriate tension, to ensure normal operation of the door panel. If the cable loses the tension, for example, the cable is broken or loosened, the door panel may fall.

SUMMARY

In view of this, in some embodiments, an overhead door system includes at least a door panel, a transmission assembly, at least one cable drum, at least one cable, and a door operator. The transmission assembly has a shaft rod. The at least one cable drum is connected to the shaft rod. One end of the at least one cable is connected to the at least one cable drum, and the other end is connected to the at least one door panel. The door operator includes a motor assembly, an actuation assembly, a ratchet retaining device, and a controller. The motor assembly has a rotating shaft operably connected to the shaft rod. The actuation assembly has a ratchet wheel and at least one gear train. The at least one gear train is operably connected to the rotating shaft, and the ratchet wheel is operably connected to the at least one gear train. The ratchet wheel correspondingly transmits a torque in response to the motor assembly driving the rotating shaft to rotate. The ratchet retaining device is configured to generate a positioning retention force on the ratchet wheel. The controller is configured to generate a control signal based on a detection signal and at least one adjustment parameter, to adjust the positioning retention force based on the control signal. The adjustment parameter ensures that the positioning retention force is greater than or equal to the torque.

In some embodiments, a door operator is configured to drive a transmission assembly of an overhead door system, and the transmission assembly has a shaft rod. The door operator includes the transmission assembly, a motor assembly, an actuation assembly, a ratchet retaining device, and a controller. The motor assembly has a rotating shaft operably connected to the shaft rod. The actuation assembly has a ratchet wheel and at least one gear train. The at least one gear train is operably connected to the rotating shaft, and the ratchet wheel is operably connected to the at least one gear train. The ratchet wheel configured to transmit a torque in response to the motor assembly driving the rotating shaft to rotate. The ratchet retaining device includes a pawl, a pawl adjustment assembly, and a detector. The pawl is configured to be engaged with the ratchet wheel. The pawl adjustment assembly has an elastic element. The pawl generates a positioning retention force on the ratchet wheel in response to the elastic element applying a biasing force to the pawl. The pawl adjustment assembly is configured to deform the elastic element based on a control signal, to adjust the positioning retention force. The detector generates a detection signal in response to disengagement of the pawl from the ratchet wheel. The controller is configured to generate the control signal based on the detection signal and at least one adjustment parameter. The adjustment parameter ensures that the positioning retention force is greater than or equal to the torque.

In summary, according to the overhead door system in some embodiments, in an abnormal condition, for example, in case of a failure or encountering an obstacle, the ratchet wheel is disconnected from the pawl, and can rotate relative to the gear train. In this case, the ratchet wheel idles, to stop the transmission assembly continuing to drive the door panel to ascend or descend. Therefore, breakage, loosening, or excessive tension change of the cable can be avoided. On the other hand, when the positioning retention force generated by the pawl for the ratchet wheel is inappropriate, the controller automatically adjusts the positioning retention force, to maintain sensitivity in detecting an abnormal state. In other words, according to some embodiments, time for manually adjusting the positioning retention force can be completely saved. In addition, when the system is mounted, a complex procedure of setting the positioning retention force for the first time can be eliminated by using an automatic adjustment function.

DETAILED DESCRIPTION

Figure 1:
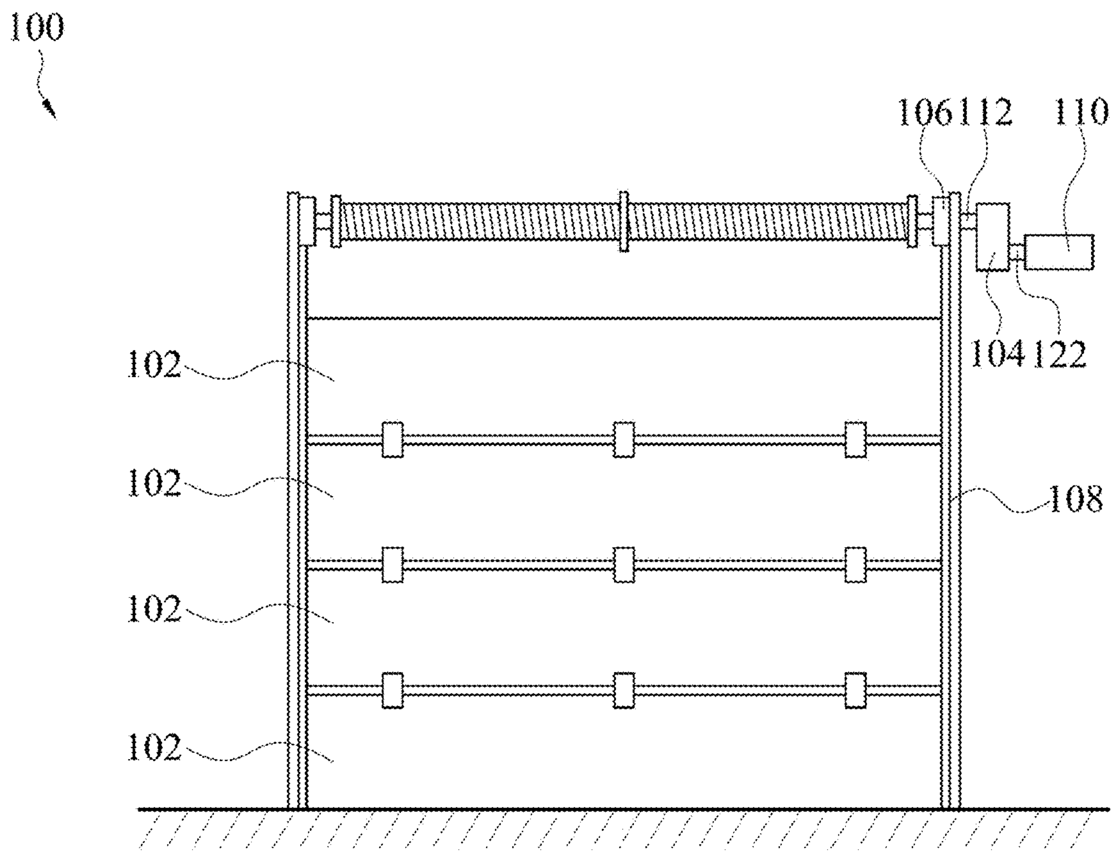
FIG. 1 is a schematic diagram of an overhead door system according to some embodiments of the present disclosure.
Figure 2:
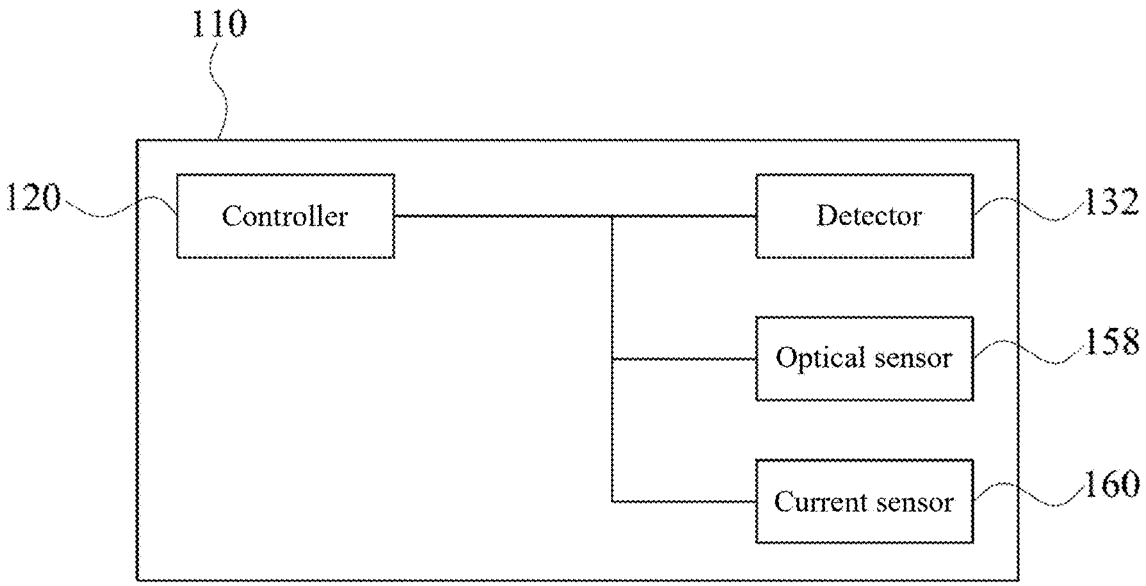
FIG. 2 is a circuit block diagram of an overhead door system according to some embodiments of the present disclosure.
Figure 3:
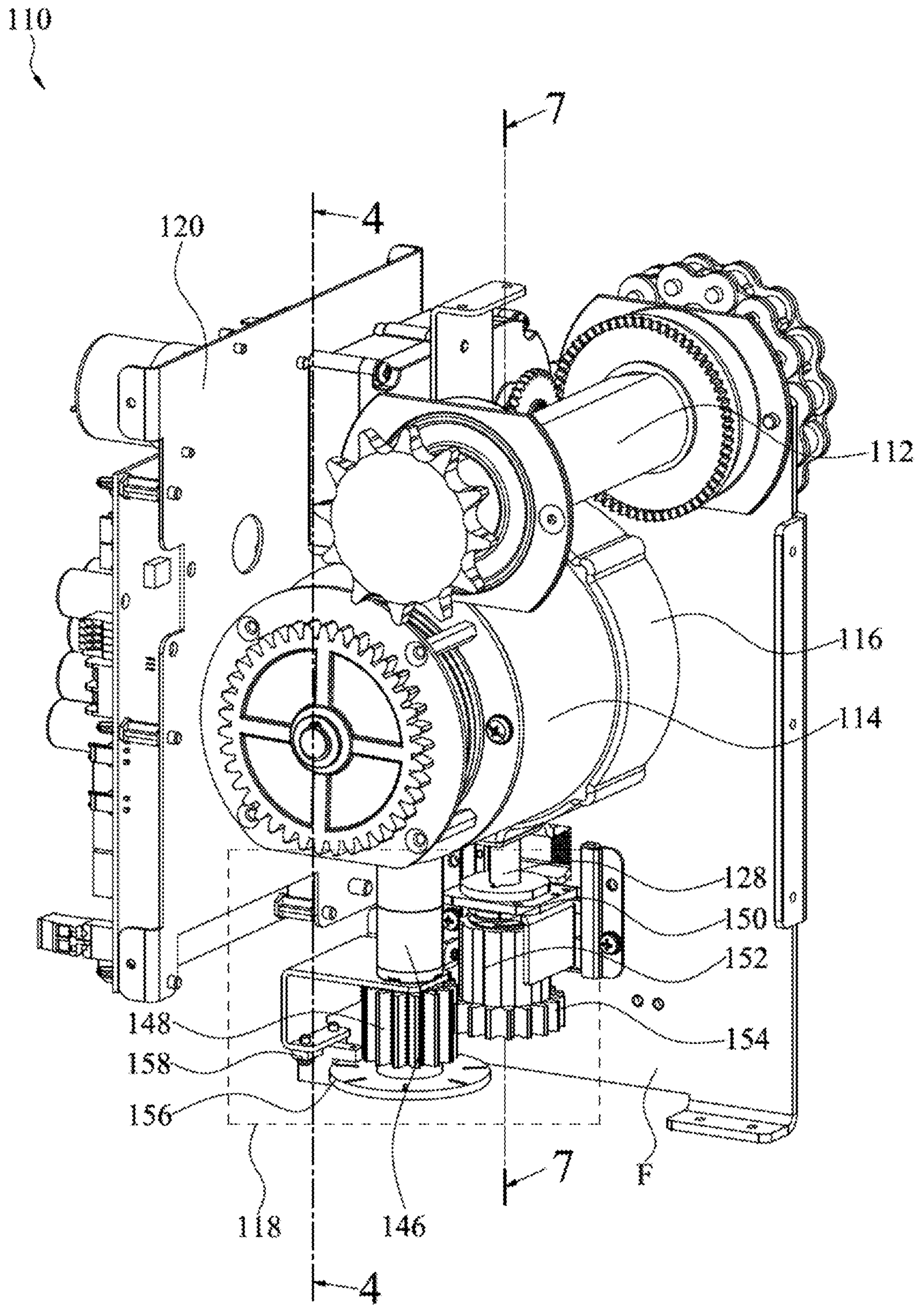
FIG. 3 is a three-dimensional diagram of a door operator according to some embodiments of the present disclosure.

Refer to FIG. 1, FIG. 2, and FIG. 3 together. In some embodiments, as shown in FIG. 1, FIG. 2, and FIG. 3, an overhead door system 100 includes at least a door panel 102, a transmission assembly 104, at least one cable drum 106, at least one cable 108, and a door operator 110. The transmission assembly 104 has a shaft rod 112. The cable drum 106 is connected to the shaft rod 112. One end of the cable 108 is connected to the cable drum 106, and the other end is connected to the door panel 102. The door operator 110 includes a motor assembly 114, an actuation assembly 116, a ratchet retaining device 118, and a controller 120. The motor assembly 114 has a rotating shaft 122. The rotating shaft 122 is operably connected to the shaft rod 112. Herein, the motor assembly 114 may drive, via the rotating shaft 122, the shaft rod 112 to rotate, to drive the cable drum 106 to wind and unwind the cable 108, so that the door panel 102 can ascend or descend with winding of the cable 108.

Refer to FIG. 2, FIG. 3, FIG. 4, and FIG. 5 together. As shown in FIG. 2, FIG. 3, FIG. 4, and FIG. 5, the actuation assembly 116 has a ratchet wheel 124 and at least one gear train 126. The ratchet wheel 124 is operably connected to the gear train 126. The gear train 126 is operably connected to the rotating shaft 122. The ratchet wheel 124 correspondingly transmits a torque in response to the motor assembly 114 driving the rotating shaft 122 to rotate. The torque may be power generated when the rotating shaft 122 drives the gear train 126 to drive, via the gear train 126, the ratchet wheel 124 to rotate. The ratchet retaining device 118 is configured to generate a positioning retention force on the ratchet wheel 124, that is, a force against the torque that stops the ratchet wheel 124 from rotating. The controller 120 generates a control signal based on a detection signal and at least one adjustment parameter, to adjust the positioning retention force based on the control signal.

Figure 4:
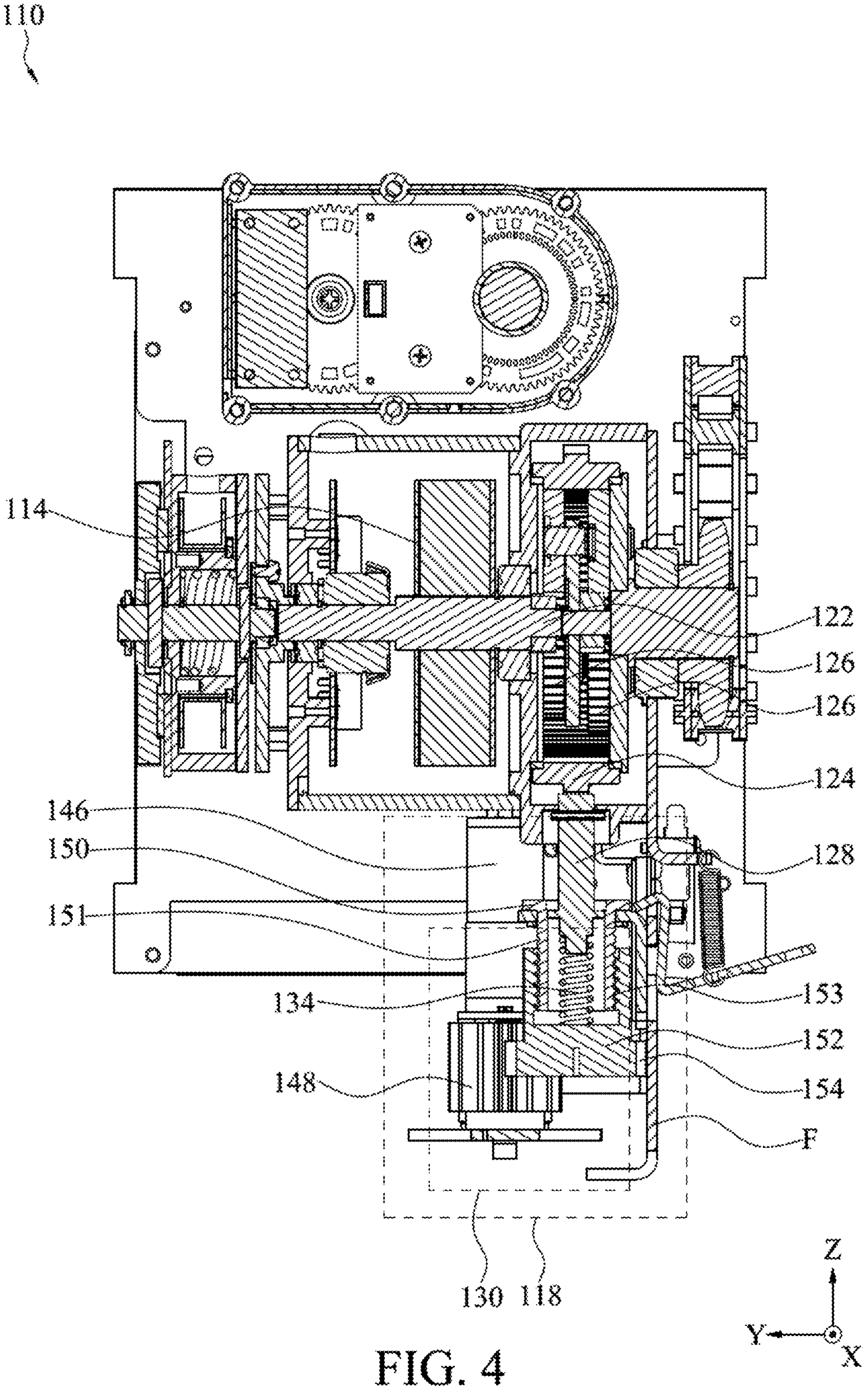
FIG. 4 is a cross-sectional view of FIG. 3 in an 4-4 direction.
Figure 7:
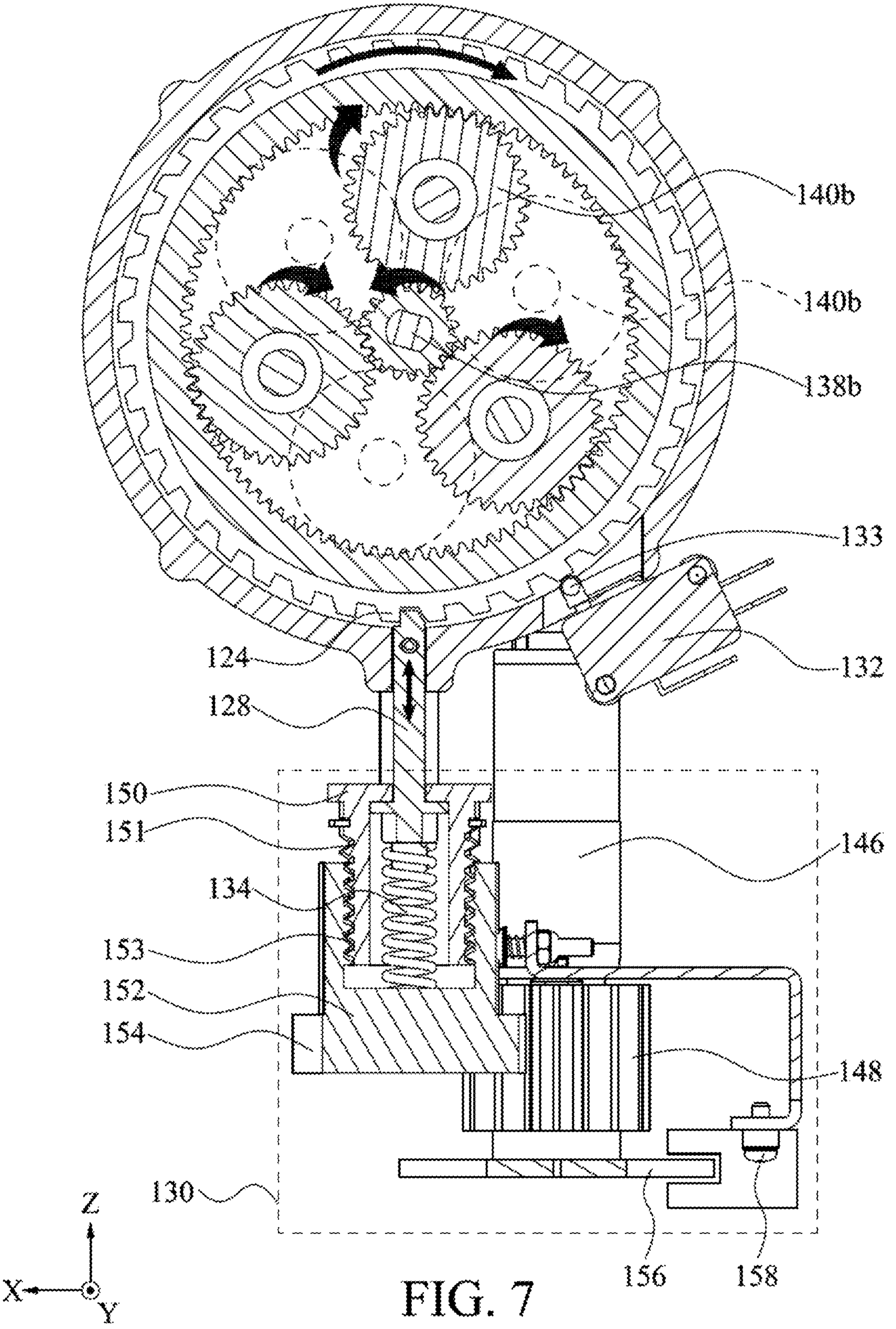
FIG. 7 is a cross-sectional view of FIG. 3 in a 7-7 direction, where a dashed-line part shows rotation of the at least one planetary gear relative to a sun gear, and a solid-line part shows idling of the at least one planetary gear.

In some embodiments, as shown in FIG. 2, FIG. 3, and FIG. 4, the ratchet retaining device 118 includes a pawl 128, a pawl adjustment assembly 130, and a detector 132 (the detector 132 shown in FIG. 7). The pawl 128 is configured to be engaged with the ratchet wheel 124. The pawl adjustment assembly 130 has an elastic element 134, for example, but not limited to, a helical spring or a pressure spring. The pawl 128 generates a positioning retention force on the ratchet wheel 124 in response to the elastic element 134 applying a biasing force to the pawl 128. The pawl adjustment assembly 130 is configured to deform the elastic element 134 based on the control signal, to adjust the positioning retention force, for example, drive the elastic element 134 to be deformed, to strengthen the positioning retention force. The detector 132 generates the detection signal in response to disengagement of the pawl 128 from the ratchet wheel 124. The detector 132 may be a contact or non-contact detector, for example, but not limited to a microswitch or a photoelectric sensor.

For example, when the door panel 102 moves normally, the pawl 128 is engaged with the ratchet wheel 124 to lock the ratchet wheel 124. Correspondingly, the transmission assembly 104 may drive the cable drum 106 normally to wind or unwind the cable 108, so that the door panel 102 ascends or descends. In an abnormal condition, for example, when the door panel 102 descends to be pressed against a foreign matter (a human body or an obstacle) and descending resistance increases, or the door panel 102 is stuck by an obstacle, the motor assembly 114 automatically increases current consumption to increase an output torque, that is, increase output power of the rotating shaft 122 for the gear train 126, to increase the torque for the ratchet wheel 124. Then, the pawl 128 is disconnected from the ratchet wheel 124 in response to the torque being greater than the positioning retention force, so that the ratchet wheel 124 rotates relative to the gear train 126. When the ratchet wheel 124 rotates, the gear train 126 idles and stops driving the shaft rod 112. More exactly, when the gear train 126 drives the ratchet wheel 124 to rotate, the cable drum 106 and the cable 108 stop driving the door panel 102, to ensure that the door panel 102 does not continue to apply a force to the foreign matter and avoid a risk caused by excessive unwinding and loosening of the cable 108. In addition, when the overhead door system 100 is mounted for the first time, the elastic element 134 may be loosened first, so that when the door panel 102 is closed, the pawl 128 can be disconnected from the ratchet wheel 124 because the biasing force applied by the elastic element 134 is excessively low. The controller 120 may control the pawl adjustment assembly 130, to adjust the biasing force applied by the elastic element 134 to the pawl 128, so that the positioning retention force generated by the pawl 128 for the ratchet wheel 124 is greater than or equal to the torque. Therefore, in some specific embodiments of the present disclosure, the positioning retention force may be automatically adjusted, so that time for manual adjustment is saved. In addition, initial setting is automatically completed when a door machine is mounted, so that a complex procedure for first adjustment is eliminated.

As shown in FIG. 2, the controller 120 may be, for example, a microprocessor, a central processing unit (CPU), a field programmable gate array (FPGA), or a control panel having the foregoing arithmetic element. The controller 120 may determine the adjustment parameter, to ensure that the positioning retention force is greater than or equal to the torque. The pawl 128 may lock the ratchet wheel 124 when the positioning retention force is greater than or equal to the torque. In addition, when the ratchet wheel 124 keeps still relative to the rotating shaft 122, the shaft rod 112 may form a power connection to the rotating shaft 122, to wind or unwind the cable 108 via the cable drum 106 and drive the door panel 102 to ascend or descend. It is to be noted that when the abnormal condition is resolved and the movement of the door panel 102 is to be restored, the controller 120 may adjust the positioning retention force by tightening or loosening the elastic element 134. The pawl 128 is engaged with the ratchet wheel 124 again in response to the positioning retention force being greater than or equal to the torque, so that the ratchet wheel 124 is locked by the pawl 128 and stops rotating, and the shaft rod 112 may drive the cable drum 106 and the cable 108 again, to restore the movement of the door panel 102.

Figure 5:
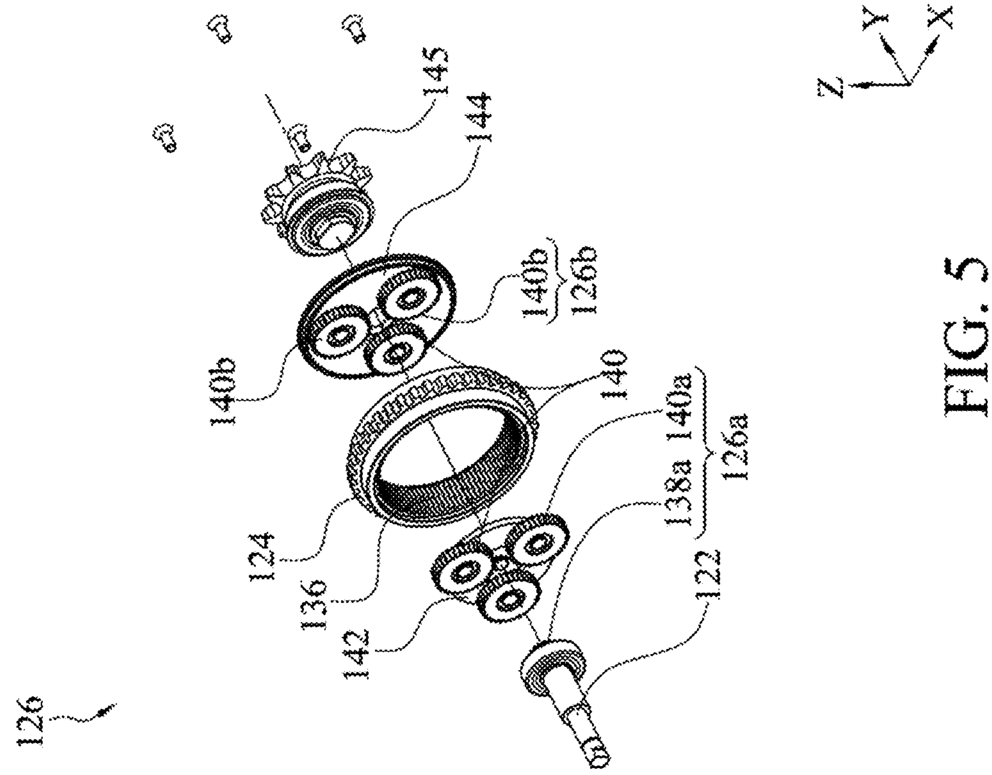
FIG. 5 is a schematic assembly diagram of a motor assembly and an actuation assembly according to some embodiments of the present disclosure.

Refer to FIG. 4 and FIG. 5 together. In some embodiments, as shown in FIG. 4 and FIG. 5, an annular gear is provided 136 on an inner side of the ratchet wheel 124. Each gear train 126 includes a sun gear 138 and at least one planetary gear 140. The sun gear 138 is connected to the rotating shaft 122. The at least one planetary gear 140 is engaged with the annular gear 136 and the sun gear 138, and drives the shaft rod 112. It is to be noted that the ratchet wheel 124 is locked and keeps still if the positioning retention force is greater than or equal to the torque, so that the planetary gear 140 rotates around the sun gear 138. Conversely, if the positioning retention force is less than the torque, the at least one planetary gear 140 does not rotate around the sun gear 138, that is, the at least one planetary gear 140 rotates in situ and drives the annular gear 136, thereby driving the ratchet wheel 124 to rotate. In response to the at least one planetary gear 140 rotating in situ, the shaft rod 112 is not driven (details are described later).

Figure 6:
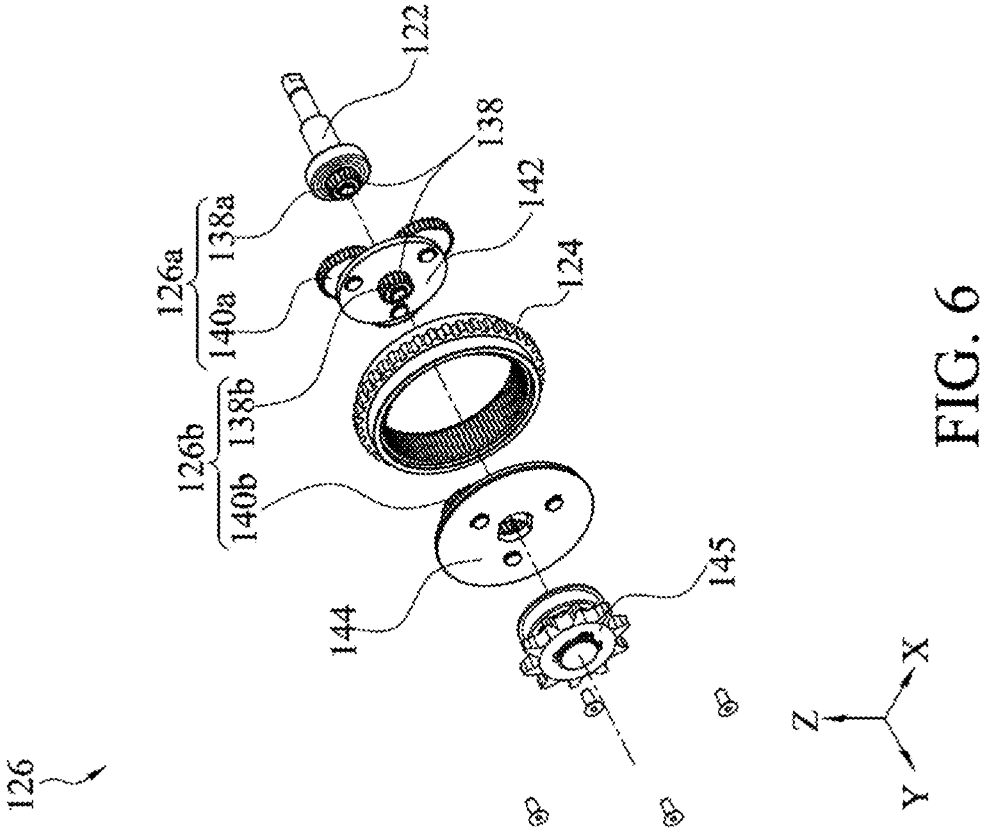
FIG. 6 is a schematic assembly diagram of FIG. 5 in another viewing angle.

Refer to FIG. 5, FIG. 6, and FIG. 7 together. In some embodiments, as shown in FIG. 5, FIG. 6, and FIG. 7, the gear train 126 includes a first gear train **126*a* and a second gear train 126*b*. The first gear train 126*a* includes a first sun gear 138*a* and multiple first planetary gears 140*a*. The second gear train 126*b* includes a second sun gear 138*b* and multiple second planetary gears 140*b*. The actuation assembly 116 further includes an input plate 142 and an output plate 144. In some embodiments, the first sun gear 138***a* is connected to the rotating shaft 122, the first planetary gears 140*a* are pivotally rotatably connected to one side of the input plate 142, and the second sun gear 138*b* is connected to the other side of the input plate 142. The second planetary gears 140*b* are rotatably connected to one side of the output plate 144, and the shaft rod 112 is connected to the other side of the output plate 144. In this way, when the rotating shaft 122 rotates, each first planetary gear 140*a* may be synchronously driven to revolve relative to the first sun gear 138*a*, to rotate the input plate 142. When the input plate 142 rotates, the second sun gear 138*b* may be driven to actuate each second planetary gear 140*b* to rotate relative to the second sun gear 138*b* (as shown by a change between positions of the solid-line and dashed-line second planetary gears 140*b* in FIG. 7), and drive the output plate 144 to rotate. In some embodiments, as shown in FIG. 5, the actuation assembly 116 further includes a chain gear 145. One end of the chain gear 145 is connected to the output plate 144, and the other end is connected to the shaft rod 112. The chain gear 145 and the output plate 144 move synchronously, so that the chain gear 145 drives the shaft rod 112 to rotate. In some embodiments, if the positioning retention force is less than the torque, when the second sun gear 138*b* rotates, each second planetary gear 140*b* rotates in situ (in FIG. 7, each second planetary gear 140*b* directly rotates, keeping the position unchanged). In this case, each second planetary gear 140*b* may drive the ratchet wheel 124 to rotate, releasing the ratchet wheel 124 from locking of the pawl 128. Because each second planetary gear 140*b* rotates in situ, the output plate 144 is not driven by each second planetary gear 140*b*.

In some embodiments, as shown in FIG. 3 and FIG. 4, the pawl adjustment assembly 130 includes a motor 146, an adjustment gear 148, a casing 150, and a sleeve 152. A driven gear 154 is arranged on an outer side of the sleeve 152. The motor 146 is connected to the adjustment gear 148. The adjustment gear 148 is engaged with the driven gear 154. The casing 150 is fixed to a frame F, and has an external thread 151. There is an internal thread 153 on an inner side of the sleeve 152. The sleeve 152 is locked to the casing 150 in a threaded manner. The elastic element 134 is arranged in the sleeve 152. One end of the elastic element 134 is pressed against the pawl 128, and the other end is pressed against the sleeve 152.

In some embodiments, the driven gear 154 is configured to deform, when actuated, the elastic element 134 to be deformed and apply the biasing force to the pawl 128. The adjustment gear 148 is configured to actuate the driven gear 154 based on the control signal. For example, when the motor 146 drives the adjustment gear 148 to rotate the driven gear 154, the sleeve 152 may move relative to the casing 150 (for example, move toward the pawl 128), to drive the elastic element 134 to be deformed and apply the biasing force to the pawl 128. It is to be noted that the adjustment parameter includes at least one rotation angle. The motor 146 may drive, based on the at least one rotation angle, the adjustment gear 148 to rotate at a corresponding phase angle. The motor 146 may be a stepper motor or a servo motor.

In some embodiments, the at least one rotation angle may be one of a consecutive number sequence or an arithmetic sequence. For example, the rotation angle is a consecutive number sequence. The adjustment gear 148 may adjust a rotation amount of the driven gear 154 at a time to keep rotation until the elastic element 134 drives the pawl 128 to the ratchet wheel 124. For example, in a rotation process of the ratchet wheel 124, the pawl adjustment assembly 130 keeps adjusting the positioning retention force of the pawl 128, until the ratchet wheel 124 stops rotation. In this case, the positioning retention force is greater than or equal to the torque (the ratchet wheel 124 keeps still). In another embodiment, the rotation angle is an arithmetic sequence. The adjustment gear 148 may rotate based on multiple rotation angles in an arithmetic sequence, for example, in a stepping manner, until the positioning retention force is greater than or equal to the torque (the ratchet wheel 124 keeps still). Herein, an angle difference between two adjacent rotation angles may be determined based on data of a gear ratio between the driven gear 154 and the adjustment gear 148, a compression ratio of the elastic element 134, a length ratio between the driven gear 154 and the elastic element 134, a preset level, or a historical adjustment angle.

In some embodiments, as shown in FIG. 3 and FIG. 4, the pawl adjustment assembly 130 further includes a slotted disc 156 and an optical sensor 158. The slotted disc 156 is arranged on the adjustment gear 148. The optical sensor 158 is coupled to the controller 120, and is configured to detect the slotted disc 156 to generate the detection angle. The detection angle is substantially equal to one of the rotation angles. Herein, the controller 120 may detect, via the optical sensor 158, whether a rotation angle (detection angle) of the adjustment gear 148 conforms to the rotation angle in the adjustment parameter. In another embodiment, a hall effect sensor may alternatively be used to detect the rotation amount of the adjustment gear 148. In some embodiments, the detector 132 is a microswitch configured such that, when the ratchet wheel 124 rotates, the ratchet wheel 124 triggers the microswitch, to generate the detection signal. FIG. 7 is used as an example. The microswitch has a trigger portion 133 that is normally located at the ratchet wheel 124. In the rotation process of the ratchet wheel 124, the trigger portion 133 may be pressed once by the ratchet wheel 124, and the detector 132 generates a detection signal in response to the trigger portion 133 being pressed once. For another example, the trigger portion 133 is normally pressed by the ratchet wheel 124. In the rotation process of the ratchet wheel 124, the trigger portion 133 may be released by the ratchet wheel 124, and the detector 132 generates a detection signal in response to the trigger portion 133 being released. In another embodiment, the detector 132 may alternatively be a non-contact sensor, for example, a photoelectric sensor, an infrared sensor, or a capacitive sensor.

In some embodiments, as shown in FIG. 2, the ratchet retaining device 118 further includes a current sensor 160. The current sensor 160 is coupled to the controller 120, and is configured to detect current consumption of the motor assembly 114. The controller 120 is configured to selectively generate the control signal based on the detection signal, the current consumption, and a current threshold. In some embodiments, the controller 120 does not generate the control signal (that is, the pawl adjustment assembly 130 does not operate) in response to obtaining the detection signal and the current consumption being greater than the current threshold. For example, as shown in FIG. 2 and FIG. 7, if the door panel 102 is in contact with the foreign matter and the descending resistance increases, or the door panel 102 is stuck by the obstacle, the motor assembly 114 automatically increases the output torque, so that the current consumption of the motor assembly increases as the torque increases. In this case, the torque of the ratchet wheel 124 may be greater than the positioning retention force of the pawl 128, and the ratchet wheel 124 may rotate. However, in this case, rotation of the ratchet wheel 124 is unrelated to whether a magnitude of the positioning retention force is appropriate, so that the pawl adjustment assembly 130 may not operate. In other words, the controller 120 may determine, based on actual current consumption of the motor assembly 114, whether the door panel 102 (load) may be in contact with the foreign matter. Then, the pawl 128 and the ratchet wheel 124 keep idling in response to the controller 120 not generating the control signal, so that the output plate 144 stops the door panel 102 from ascending or descending. Herein, when obtaining the detection signal and determining, through comparison, that the current consumption is greater than the current threshold, the controller 120 may determine that the door panel 102 is pressed against the obstacle, and stop the door panel 102 from continuing to descend or ascend, to ensure that the door panel 102 does not continue to apply a force to the obstacle, so that breakage or loosening of the cable 108 can be avoided. In some embodiments, the current threshold may be a peak value of the current consumption of the motor assembly 114 in a complete door opening/closing travel of the door panel 102 in a normal operation state. Herein, the current threshold may be a current value or a current value range. In some embodiments, as shown in FIG. 2 and FIG. 7, the controller 120 generates the control signal in response to obtaining the detection signal and the current consumption conforming to the current threshold. For example, in the normal operation state, the detector 132 generates the detection signal when the ratchet wheel 124 and the pawl 128 are separated from each other and idle due to a mechanical failure or component aging (for example, aging of the elastic element 134). In this case, the controller 120 further determines whether the current consumption conforms to the current threshold. When the controller 120 obtains the detection signal, and determines, through comparison, that the current consumption conforms the current threshold, the controller 120 may generate the control signal, so that the ratchet retaining device 118 adjusts the positioning retention force to be greater than or equal to the torque, to drive the door panel 102 to continue to operate.

In summary, according to the overhead door system 100 in some embodiments, when the door operator 110 is in an abnormal condition, the ratchet wheel 124 is automatically disconnected from the pawl 128, and the ratchet wheel 124 can rotate relative to the gear train 126, to stop the transmission assembly 104 from continuing to drive the door panel 102 to ascend or descend, and stop the door panel 102 in time from operating. On the other hand, in the normal operation state, the controller 120 may automatically adjust the positioning retention force of the pawl 128 for the ratchet wheel 124 due to the mechanical failure or component aging (for example, aging of the elastic element 134). However, the pawl 128 may be engaged with the ratchet wheel 124 again in response to the positioning retention force being greater than or equal to the torque, so that the ratchet wheel 124 stops rotating. Then, the transmission assembly 104 may continue to drive the door panel 102 to ascend or descend. Herein, when the motor assembly 114 drives the door panel 102, the cable drum 106 and the cable 108 may maintain appropriate tension.

What is claimed is:

1. A door operator configured to drive a transmission assembly of an overhead door system, the transmission assembly having a shaft rod, the door operator comprising:

a motor assembly having a rotating shaft operably connected to the shaft rod;

an actuation assembly having a ratchet wheel and at least one gear train, the at least one gear train operably connected to the rotating shaft, the ratchet wheel operably connected to the at least one gear train, the ratchet wheel transmits a torque in response to activation of the motor assembly;

a ratchet retaining device, comprising:

a pawl configured to engage with the ratchet wheel;

a pawl adjustment assembly having an elastic element, wherein the pawl applies a positioning retention force to the ratchet wheel in response to the elastic element applying a biasing force to the pawl, the pawl adjustment assembly configured to deform, based on a control signal, the elastic element to adjust the positioning retention force; and a detector configured to generate a detection signal in response to disengagement of the pawl from the ratchet wheel; and a controller configured to generate the control signal based on the detection signal and at least one adjustment parameter, wherein the adjustment parameter ensures that the positioning retention force is sufficient to prevent the ratchet wheel from being rotated by the torque.

2. The door operator according to claim 1, wherein an annular gear is provided on an inner side of the ratchet wheel, the at least one gear train comprises a sun gear and at least one planetary gear, the sun gear is connected to the rotating shaft, and the at least one planetary gear is engaged with the annular gear and the sun gear, and the at least one planetary gear is configured to drive the shaft rod, wherein the at least one planetary gear rotates in situ and does not drive the shaft rod when the ratchet wheel rotates.

3. The door operator according to claim 1, wherein the at least one gear train comprises a first gear train and a second gear train, the first gear train comprises a first sun gear and a plurality of first planetary gears, and the second gear train comprises a second sun gear and a plurality of second planetary gears; the actuation assembly further comprises an input plate and an output plate; and the first sun gear is connected to the rotating shaft, the first planetary gears are rotatably connected to one side of the input plate, the second sun gear is connected to the other side of the input plate, the second planetary gears are rotatably connected to one side of the output plate, and the shaft rod is connected to the other side of the output plate.

4. The door operator according to claim 1, wherein the pawl adjustment assembly comprises:

a driven gear configured to deform, when actuated, the elastic element to apply the biasing force to the pawl; and an adjustment gear configured to actuate the driven gear based on the control signal, wherein the adjustment parameter comprises a rotation angle of the adjustment gear.

5. The door operator according to claim 4, wherein the pawl adjustment assembly further comprises:

a sleeve provided with the driven gear;

a casing fixed to a frame, the sleeve threadedly engaging the casing, the elastic element arranged in the sleeve, and two ends of the elastic element pressed against the pawl and the sleeve respectively; and a motor connected to the adjustment gear and configured to drive the adjustment gear to rotate the driven gear, so that the sleeve moves relative to the casing.

6. The door operator according to claim 4, wherein the rotation angle of the adjustment gear is selected from a consecutive number sequence or an arithmetic sequence.

7. The door operator according to claim 4, wherein the pawl adjustment assembly comprises:

a slotted disc arranged on the adjustment gear; and an optical sensor coupled to the controller and configured to detect rotation of the slotted disc to generate a detection angle, wherein the detection angle is substantially equal to the rotation angle of the adjustment gear.

8. The door operator according to claim 1, wherein the detector is a microswitch configured such that, when the ratchet wheel rotates, the ratchet wheel triggers the microswitch to generate the detection signal.

9. The door operator according to claim 1, wherein the ratchet retaining device further comprises a current sensor coupled to the controller and configured to detect current consumption of the motor assembly; and the controller is configured to selectively generate the control signal based on the detection signal, the current consumption, and a current threshold.

10. An overhead door system, comprising:

at least one door panel;

a transmission assembly having a shaft rod;

at least one cable drum connected to the shaft rod;

at least one cable, one end of the at least one cable connected to the at least one cable drum, and the other end of the at least one cable connected to the at least one door panel; and a door operator comprising:

a motor assembly having a rotating shaft being operably connected to the shaft rod;

an actuation assembly having a ratchet wheel and at least one gear train, the at least one gear train operably connected to the rotating shaft, the ratchet wheel operably connected to the at least one gear train, the ratchet wheel configured to transmits a torque in response to activation of the motor assembly;

a ratchet retaining device configured to generate a positioning retention force on the ratchet wheel; and a controller configured to generate a control signal based on a detection signal and at least one adjustment parameter to adjust the positioning retention force, wherein the adjustment parameter ensures that the positioning retention force is sufficient to prevent the ratchet wheel from being rotated by the torque.

* * * * *